United States Patent
Demos

(10) Patent No.: US 9,272,669 B2
(45) Date of Patent: Mar. 1, 2016

(54) VEHICULAR GAP FILLER POCKET ASSEMBLY

(71) Applicant: Christopher G. Demos, Park Ridge, IL (US)

(72) Inventor: Christopher G. Demos, Park Ridge, IL (US)

(*) Notice: Subject to any disclaimer, the term of this patent is extended or adjusted under 35 U.S.C. 154(b) by 0 days.

(21) Appl. No.: 14/321,267

(22) Filed: Jul. 1, 2014

(65) Prior Publication Data

US 2015/0028637 A1    Jan. 29, 2015

Related U.S. Application Data

(60) Provisional application No. 61/842,161, filed on Jul. 23, 2013.

(51) Int. Cl.
*B60R 7/04* (2006.01)
*B60R 11/00* (2006.01)

(52) U.S. Cl.
CPC ................ *B60R 11/00* (2013.01); *B60R 7/043* (2013.01)

(58) Field of Classification Search
CPC ............ B60N 2/44; B60N 3/101; B60R 7/04
See application file for complete search history.

(56) References Cited

U.S. PATENT DOCUMENTS

| | | | | |
|---|---|---|---|---|
| 2,526,576 A * | 10/1950 | Nelson | ............ | A47D 1/008 297/182 |
| 4,948,195 A * | 8/1990 | Saunders | ............ | B60N 2/441 108/44 |
| 6,022,072 A * | 2/2000 | Moyer | ............ | A47C 7/62 248/909 |
| D533,325 S * | 12/2006 | Bird | ............ | D34/1 |
| 7,527,314 B2 * | 5/2009 | Dohan | ............ | B60R 11/00 296/37.8 |
| 7,736,711 B2 * | 6/2010 | Dobelle | ............ | A47B 95/043 211/86.01 |
| 8,056,970 B1 * | 11/2011 | Phillips | ............ | B60N 2/6009 296/1.07 |
| 8,282,161 B1 * | 10/2012 | Jacobson | ............ | B60N 2/6009 224/275 |
| D685,718 S * | 7/2013 | Williams | ............ | D12/416 |
| 2007/0241581 A1 * | 10/2007 | Martin | ............ | B60N 3/00 296/37.8 |
| 2008/0272166 A1 * | 11/2008 | Frank | ............ | B60R 7/04 224/544 |
| 2008/0283565 A1 * | 11/2008 | Simon | ............ | B60R 11/00 224/542 |
| 2009/0096240 A1 * | 4/2009 | Hanzel | ............ | B60N 3/08 296/37.8 |
| 2009/0127882 A1 * | 5/2009 | Thibodeau | ............ | B60R 7/043 296/37.8 |
| 2009/0134688 A1 * | 5/2009 | Waltman | ............ | B60N 3/101 297/463.2 |
| 2009/0224563 A1 * | 9/2009 | Gregory | ............ | B60R 11/00 296/1.07 |
| 2011/0266820 A1 * | 11/2011 | Hurwitz | ............ | B60N 2/6009 296/1.07 |
| 2012/0204771 A1 * | 8/2012 | Fukuhara | ............ | A47B 5/04 108/134 |
| 2015/0114270 A1 * | 4/2015 | Tsuchida | ............ | B60N 3/002 108/44 |

* cited by examiner

*Primary Examiner* — Brian D Nash
(74) *Attorney, Agent, or Firm* — Christopher J. Scott

(57) ABSTRACT

A vehicular seat-to-hump gap filler device is inserted between a vehicular seat and hump for filling the gap between the seat and hump. The vehicular seat-to-hump gap filler device includes lower and upper pocket constructions. The lower pocket construction includes a hemi-ellipsoidal outer surface, a hemi-ellipsoidal inner surface, and an upper rim. The outer surface is sized and shaped for insertion between a vehicular seat and hump. The inner surface receives a portion of the upper pocket construction. The upper pocket construction includes an upper flange section and at least one semi-ellipsoidal cavity construction extending from the upper flange section. Each cavity construction is received in adjacency to the inner surface of the lower pocket construction and defines an upper matter-receiving pocket. The upper flange section is seatable upon the upper rim, and each matter-receiving pocket receives and collects matter for enabling a user to retrieve received matter as collected.

20 Claims, 8 Drawing Sheets

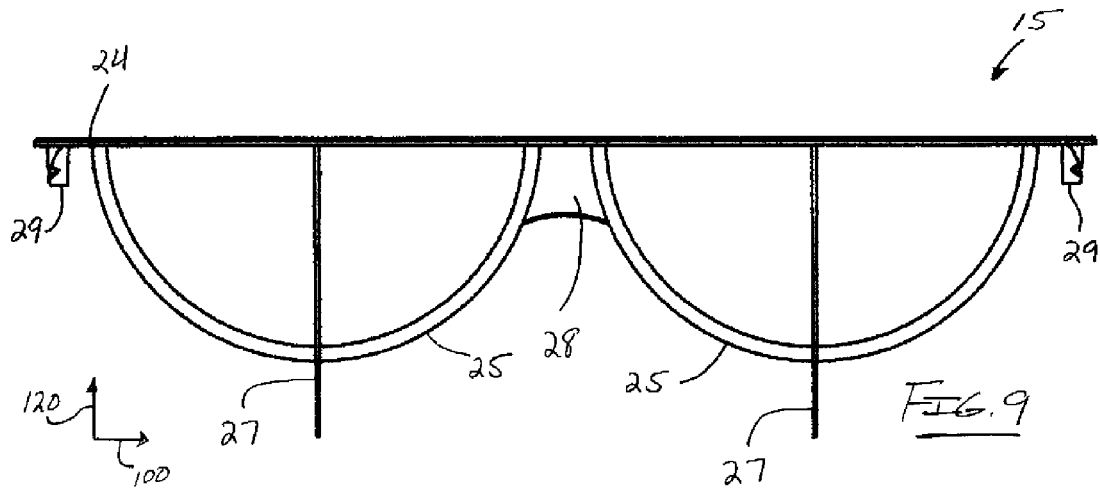
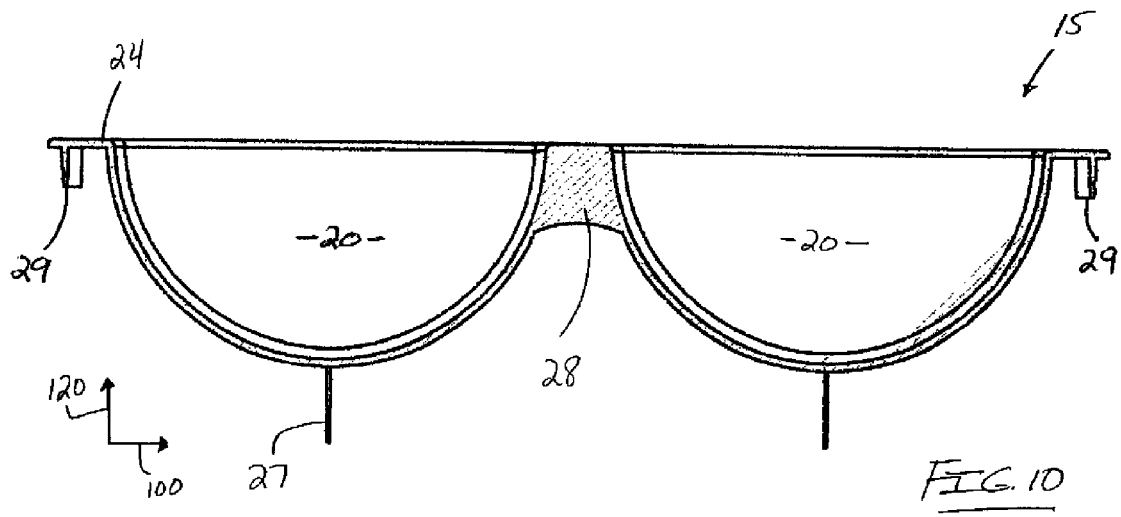
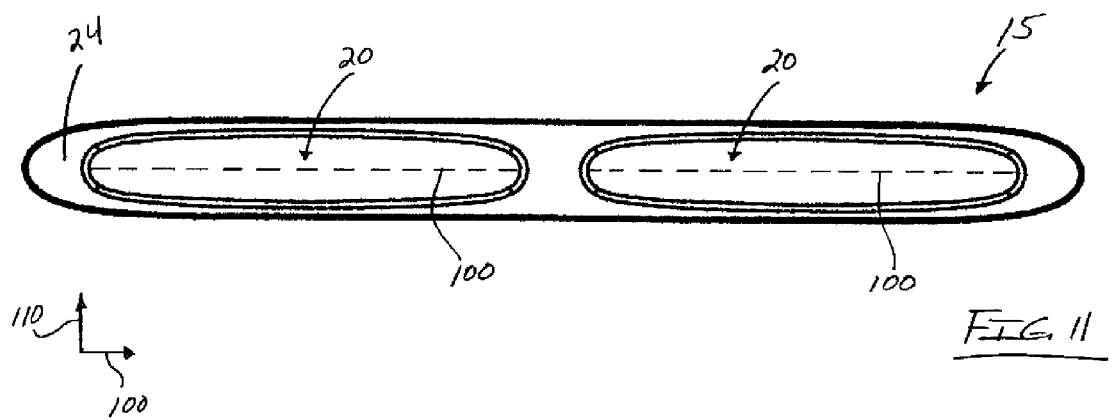

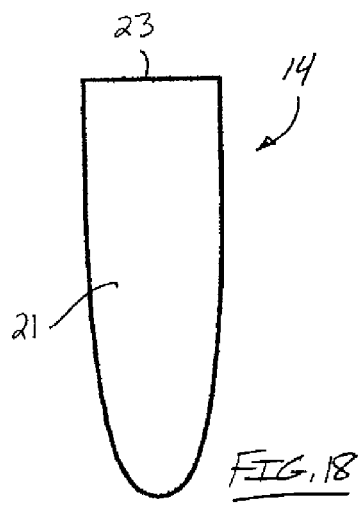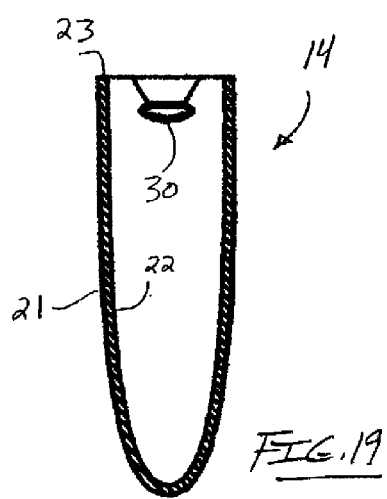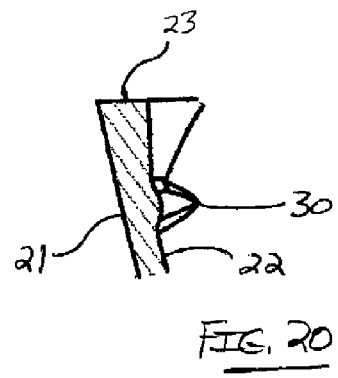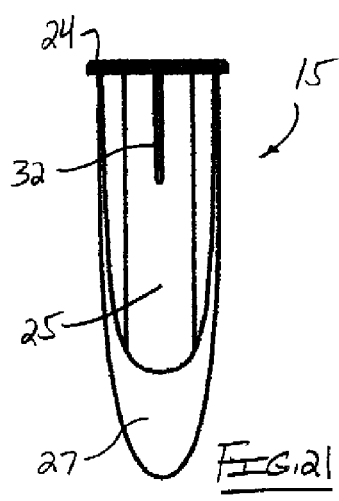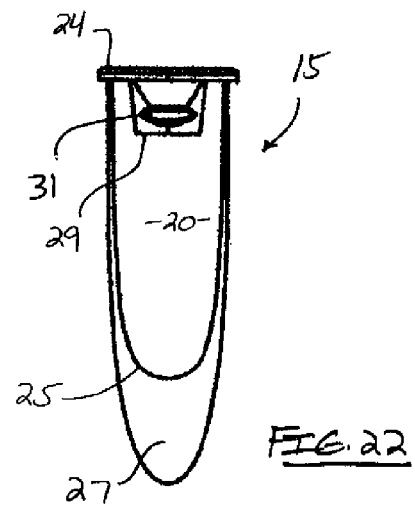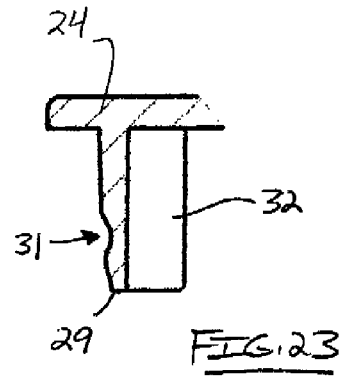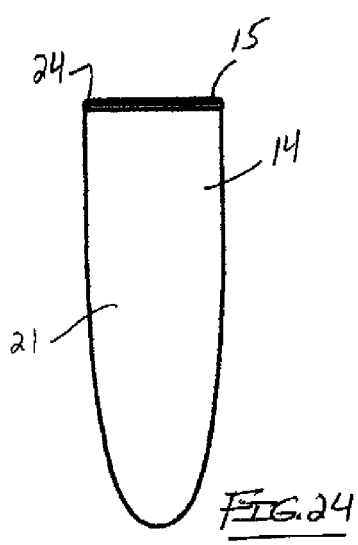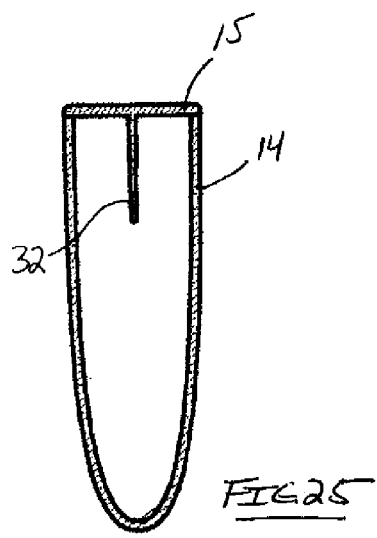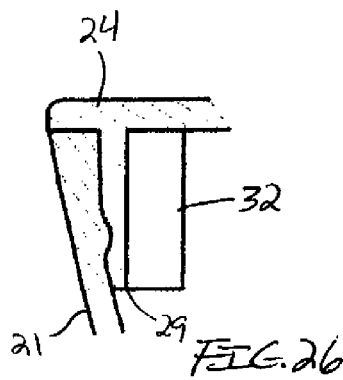

VEHICULAR GAP FILLER POCKET ASSEMBLY

PRIOR HISTORY

This application claims the benefit of U.S. Provisional Patent Application No. 61/842,161 filed in the United States Patent and Trademark Office on 2 Jul. 2013.

BACKGROUND OF THE INVENTION

Field of the Invention

The disclosed invention generally relates to an aftermarket vehicle accessory. More particularly, the present invention relates to a device insertable between a vehicular seat and vehicular hump for colleting articles therein.

SUMMARY OF THE INVENTION

The present invention provides a vehicular seat-to-hump gap-filling or gap filler device for insertion between a vehicular seat, and a vehicular hump for closing or filling a portion of the gap between the vehicular seat(s) and the vehicular hump. In other words, between vehicular seats and the vehicle hump are gaps into which gaps loose items often present in the vehicular cabin can fall.

Such items may include keys, food scraps, mobile phones, writing utensils, and the like. Without the aid of some device or apparatus to fill these gaps, these types of items often become lodged underneath the seats via the gaps, and the recovery of such items can often prove difficult, particularly when the vehicle is in motion and if the driver does not have a companion.

To partially fill the gaps and prevent the difficult recovery of these and any number of other items, the present invention basically provides a vehicular seat-to-hump gap filler device, which device operates to not only partially fill the gaps, but operates to collect and/or organize any number of such items for ready retrieval by upwardly facing pocket constructions.

To achieve these primary objectives, the vehicular seat-to-hump gap filler device according to the present invention preferably comprises a lower pocket construction, and an upper pocket construction. The lower pocket construction preferably comprises a halved ellipsoidal volumetric shape or a hemi-ellipsoidal outer surface, a hemi-ellipsoidal inner surface, and an upper rim.

The hemi-ellipsoidal outer surface is preferably sized and shaped for insertion between the vehicular seat and the vehicular hump. The hemi-ellipsoidal inner surface is sized and shaped for receiving the upper pocket construction, which upper pocket construction preferably comprises a planar upper flange section, and at least one, but preferably a pair of semi-ellipsoidal cavity constructions that extend from the upper flange section into the lower pocket construction and the space defined by the inner surfacing thereof.

Accordingly, each of the semi-ellipsoidal cavity constructions are receivable in adjacency to the hemi-ellipsoidal inner surface as part of the upper pocket construction and preferably comprise or define a matter-receiving pocket or pocket construction and a longitudinal cavity axis. The longitudinal cavity axes of the pocket constructions are preferably aligned. The upper flange section of the upper pocket construction is seatable upon the upper rim of the lower pocket construction, and the matter-receiving pocket(s) basically function to receive and collect matter and enable a user to easily and manually retrieve received matter as collected within said pocket construction(s).

The vehicular seat-to-hump gap filler device according to the present invention further preferably comprises certain upper-to-lower pocket construction locking means for selectively locking the upper pocket construction to the lower pocket construction. The upper-to-lower pocket construction locking means may be preferably exemplified by comprising at least one resilient notched tab and at least one fixed protrusion. The notched tabs each preferably comprise a notch for receiving the fixed protrusions and a rib wing for increasing the resilience of the respective tabs.

Each resilient notched tab is preferably resiliently engageable with a respective fixed protrusion for selectively locking the upper pocket construction to the lower pocket construction. The fixed protrusions preferably extend from the inner surface of the lower pocket construction and the resilient notched tabs preferably extend from the upper flange section of the upper pocket construction. In the preferred embodiment, a pair of longitudinally-opposed, resilient notched tabs extends from the upper flange section of the upper pocket construction, and a pair of longitudinally-opposed, fixed protrusions extends from the inner surface of the lower pocket construction.

Each semi-ellipsoidal cavity construction further preferably comprises a parabolic spacer element, which parabolic spacer elements basically function to structurally space each semi-ellipsoidal cavity construction from the inner surface of the lower pocket construction. The parabolic spacer elements preferably extend orthogonally relative to the longitudinal cavity axes of the pocket constructions.

Further, each of the semi-ellipsoidal cavity constructions are preferably structurally interconnected via a rib element for increasing the strength and stability of the upper pocket construction. Each rib element is preferably coplanar with the longitudinal cavity axes of the pocket constructions. Other objects of the present invention, as well as particular features, elements, and advantages thereof, will be elucidated or become apparent from, the following brief descriptions and the accompanying drawing figures.

BRIEF DESCRIPTION OF THE DRAWINGS

Other features and objectives of my invention will become more evident from a consideration of the following brief descriptions of patent drawings:

FIG. 9 is a lateral elevational view of an upper pocket construction of the vehicular seat-to-hump gap-filling or gap filler device according to the present invention.

FIG. 10 is a longitudinal cross-sectional view of the upper pocket construction of the vehicular seat-to-hump gap-filling or gap filler device according to the present invention.

FIG. 11 is a top plan view of the upper pocket construction of the vehicular seat-to-hump gap-filling or gap filler device according to the present invention.

FIG. 18 is an elevational end view of the lower pocket construction of the vehicular seat-to-hump gap-filling or gap filler device according to the present invention.

FIG. 19 is a lateral cross-sectional view of the lower pocket construction of the vehicular seat-to-hump gap-filling or gap filler device according to the present invention.

FIG. 20 is an enlarged fragmentary longitudinal cross-sectional view of an upper end of the lower pocket construction of the vehicular seat-to-hump gap-filling or gap filler device according to the present invention showing a fixed protrusion for locking the lower pocket construction to the upper pocket construction.

FIG. 21 is a lateral cross-sectional view of the upper pocket construction of the vehicular seat-to-hump gap-filling or gap filler device according to the present invention.

FIG. 22 is an elevational end view of the upper pocket construction of the vehicular seat-to-hump gap-filling or gap filler device according to the present invention.

FIG. 23 is an enlarged fragmentary longitudinal cross-sectional view of an upper end of the upper pocket construction of the vehicular seat-to-hump gap-filling or gap filler device according to the present invention showing a resilient notched tab for locking the upper pocket construction to the lower pocket construction.

FIG. 24 is an elevational end view of the assembled lower and upper pocket constructions of the vehicular seat-to-hump gap-filling or gap filler device according to the present invention.

FIG. 25 is a lateral cross-sectional view of the assembled lower and upper pocket constructions of the vehicular seat-to-hump gap-filling or gap filler device according to the present invention.

FIG. 26 is an enlarged fragmentary longitudinal cross-sectional view of an upper end of the assembled lower and upper pocket construction of the vehicular seat-to-hump gap-filling or gap filler device according to the present invention showing the fixed protrusion and resilient notched tab locking the lower pocket construction to the upper pocket construction.

DETAILED DESCRIPTION OF THE PREFERRED EMBODIMENTS

Figure 1:
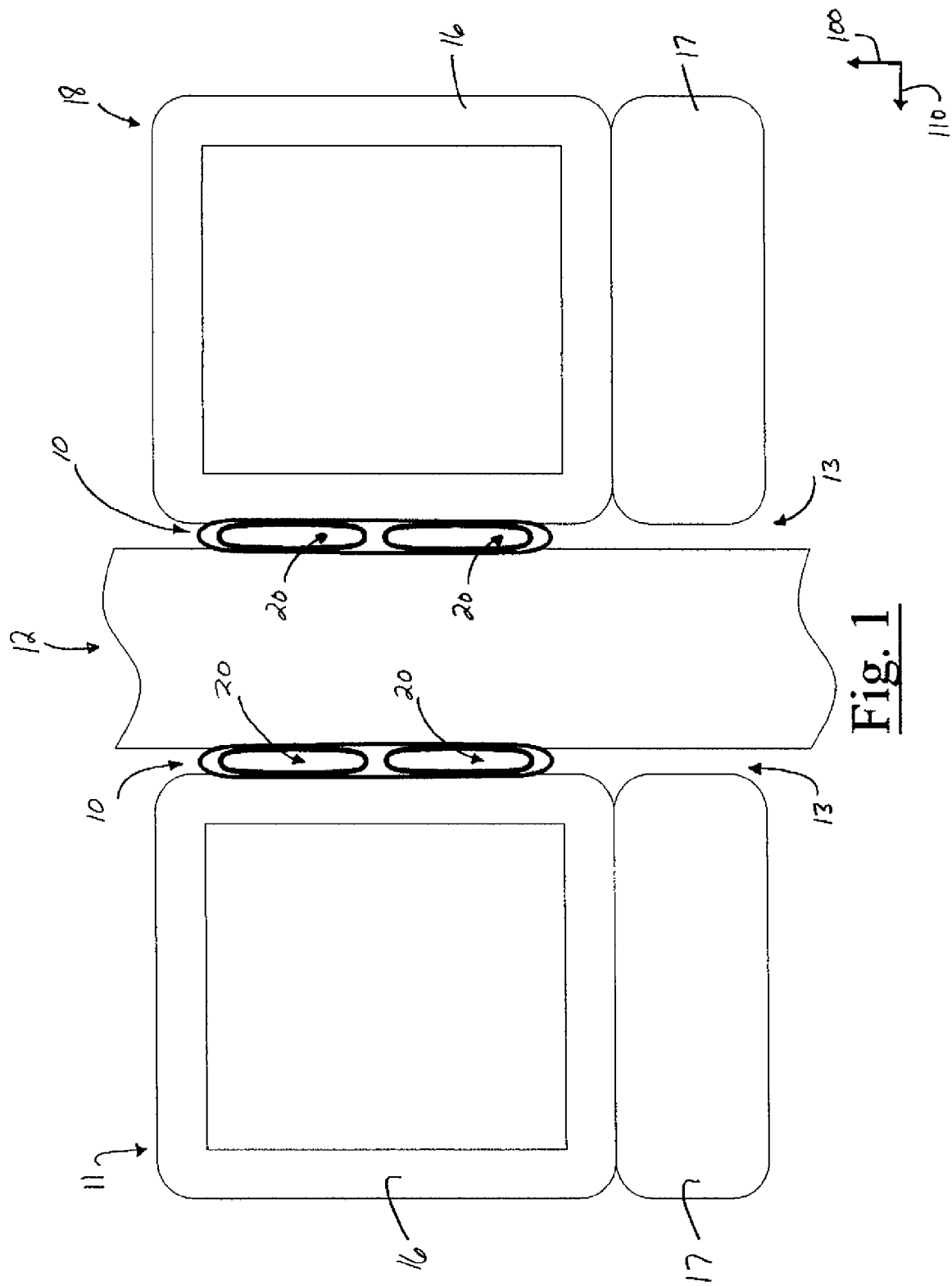
FIG. 1 is a top plan type depiction of two laterally opposed, parallel vehicular seat-to-hump gap-filling or gap filler devices according to the present invention depicted in a condition of use within a vehicular cabin wedged in gaps between laterally opposed vehicular seats and a centralized fragmentary vehicular hump.

Referring now to the drawings with more specificity, the present invention provides a vehicular seat-to-hump gap-filling or gap filler device as at 10 for insertion between a vehicular seat as at 11 or 18, and a vehicular hump as at 12 (i.e. that structure evident within a vehicular cabin otherwise known as a transmission tunnel) for closing or filling a portion of the gap as referenced at 13 between the vehicular seat(s) 11 or 18 and the vehicular hump 12.

Referencing FIG. 1, the reader will there see a generic driver's seat 11 (for right lane driving jurisdictions) comprising a seat support or lower portion as at 16 and a seat back or upper portion as at 17 to the left of the vehicle hump 12. A passenger seat 18 is similarly juxtaposed to the right of the vehicle hump 12. Between the respective seats 11 and 18 and the vehicle hump 12 are gaps as at 13 into which gaps 13 loose items often present in the vehicular cabin can fall.

Such items may include keys, food scraps, mobile phones, writing utensils, and the like. Without the aid of some device or apparatus to fill the gap 13, these types of items often become lodged underneath the seats 11 and/or 18 via the gaps 13 as generally referenced at location 19, and the recovery of such items can often prove difficult, particularly when the vehicle is in motion and if the driver does not have a companion.

To partially fill the gaps 13 and prevent the difficult recovery of these and any number of other items, the present invention basically provides a vehicular seat-to-hump gap filler device 10, which device 10 not only partially fills the gaps 13, but operates to collect and/or organize any number of such items for ready retrieval by upwardly facing pocket constructions as at 20. To achieve these primary objectives, the vehicular seat-to-hump gap filler device 10 according to the present invention preferably comprises a lower pocket construction as at 14, and an upper pocket construction as at 15.

The lower pocket construction 14 preferably comprises a halved ellipsoidal volumetric shape or a hemi-ellipsoidal outer surface as at 21, a hemi-ellipsoidal inner surface as at 22, a first semi-axis as at 101, a second semi-axis as at 102, a third semi-(half)-axis as at 103, and an upper rim as at 23. The first semi-axis 101 extends longitudinally in a first dimension as at 100 and is relatively longer than the second and third semi-axes 102 and 103. The second semi-axis 102 extends laterally in a second dimension 110 and is relatively shorter than the third semi-(half)-axis 103.

In other words, the hemi-ellipsoidal outer and inner surfaces 21 and 22 are hemi-ellipsoidal so as to fully embrace the first and second semi-axes 101 and 102, while the third semi-(half)-axis contemplates a full ellipsoidal semi-axis halved at an upper pocket construction plane as at 104, which plane 104 is coplanar with the first and second semi-axes 101 and 102 and which third semi-(half)-axis extends in a third dimension as at 120.

The hemi-ellipsoidal outer surface 21 is preferably sized and shaped for insertion between the vehicular seat(s) as at 11 or 18 and the vehicular hump as at 12 as generally depicted in FIG. 1 and as diagrammatically depicted in FIGS. 2-5. The hemi-ellipsoidal inner surface 22 is sized and shaped for receiving the upper pocket construction 15, which upper pocket construction 15 preferably comprises a planar upper flange section 24, and at least one, but preferably a pair of semi-ellipsoidal cavity constructions 25 that extend from the upper flange section 24 in the third dimension 120.

Each of the semi-ellipsoidal cavity constructions 25 are receivable in adjacency to the hemi-ellipsoidal inner surface 22 as part of the upper pocket construction 15 and preferably comprise or define a matter-receiving pocket or pocket construction as at 20, and a longitudinal cavity axis as at 100. The longitudinal cavity axes 100 are preferably aligned as generally depicted in FIGS. 1, 11, 13, 14, and 17.

The upper flange section 24 of the upper pocket construction 15 is seatable upon the upper rim 23 of the lower pocket construction 14, and the matter-receiving pocket(s) or pocket construction(s) 20 basically function to receive and collect matter directed theretowards or thereinto (e.g. loose items falling or items being purposefully placed therein) and enable a user to easily and manually retrieve received matter as collected within said pocket construction(s) 20.

The vehicular seat-to-hump gap filler device 10 according to the present invention further preferably comprises certain upper-to-lower pocket construction locking means for selectively locking the upper pocket construction 15 to the lower pocket construction 14. The upper-to-lower pocket construction locking means may be preferably exemplified by comprising at least one resilient notched tab as at 29 and at least one fixed protrusion as at 30. The notched tabs 29 each preferably comprise a notch 31 for receiving the fixed protrusions 30 and a rib wing 32 for increasing the resilience of the respective tabs 29.

Each resilient notched tab 29 is preferably resiliently engageable with a respective fixed protrusion 30 for selectively locking the upper pocket construction 15 to the lower pocket construction 14. The fixed protrusions 30 preferably extend from the inner surface 22 of the lower pocket construction 14 and the resilient notched tabs 29 preferably extend from the upper flange section 24 of the upper pocket construction 15. In the preferred embodiment, a pair of longitudinally-opposed, resilient notched tabs 29 extends from the upper flange section 24 of the upper pocket construction 15, and a pair of longitudinally-opposed, fixed protrusions 30 extends from the inner surface 22 of the lower pocket construction.

Each semi-ellipsoidal cavity construction 25 further preferably comprises a parabolic spacer element as at 27, which parabolic spacer elements 27 basically function to structurally space each semi-ellipsoidal cavity construction 25 from the inner surface 22 of the lower pocket construction 14. The parabolic spacer elements 27 preferably extend orthogonally relative to the longitudinal cavity axes 100 in the third dimension 120. Further, each of the semi-ellipsoidal cavity constructions 25 are preferably structurally interconnected via a rib element as at 28 for increasing the strength and stability of the upper pocket construction 15. Each rib element 28 is preferably coplanar with the longitudinal cavity axes 100.

Figure 2:
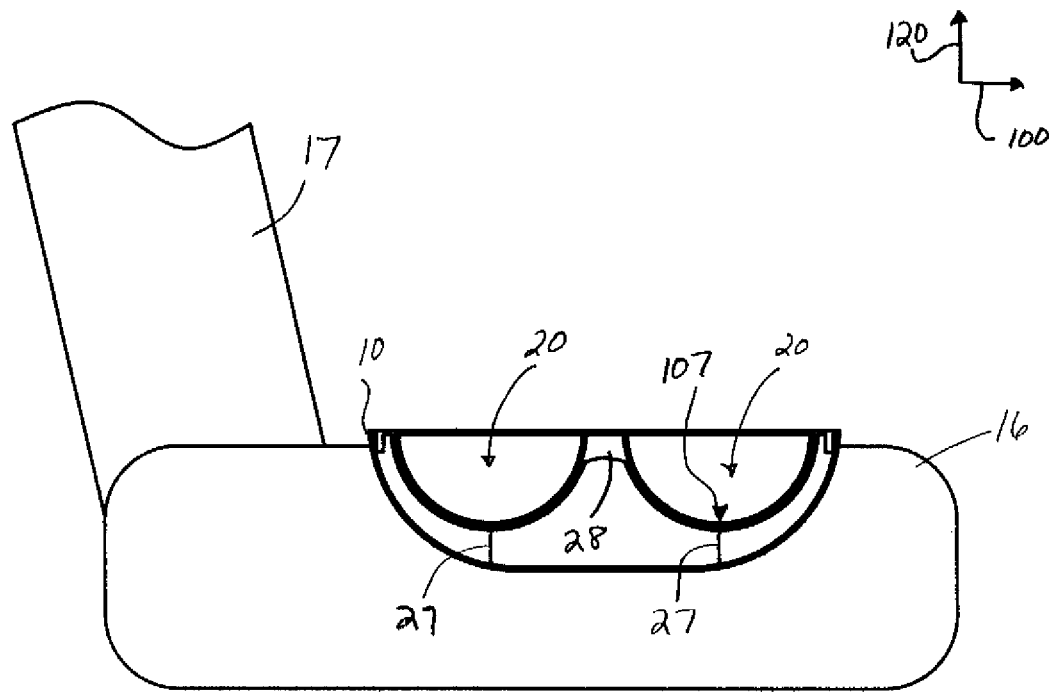
FIG. 2 is a first sequential longitudinal cross-sectional type depiction of the vehicular seat-to-hump gap-filling or gap filler device according to the present invention shown juxtaposed adjacent a vehicular seat before an object has been received and collected in said device, the device being depicted in cross-section for illustrating otherwise hidden structure.
Figure 3:
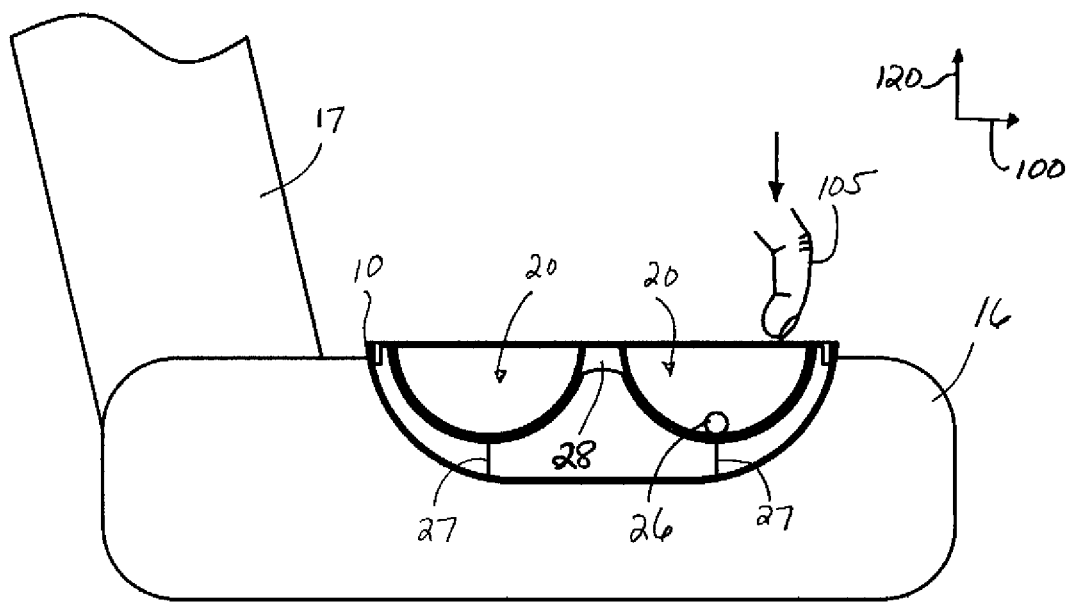
FIG. 3 is a second sequential longitudinal cross-sectional type depiction of the vehicular seat-to-hump gap-filling or gap filler device according to the present invention shown juxtaposed adjacent a vehicular seat with an object received and collected in a pocket of said device, and a user's finger being directed into the pocket to collect or retrieve the object.

Comparatively referencing FIGS. 2-5, the reader will there see a small round object as at 26 (such as a marble or small coin) depicting a small generic item received and collected within the right-hand pocket construction 20 as illustrated. FIG. 2 depicts an empty device longitudinally halved in cross-section so the reader may view its empty state. FIG. 3 depicts the small round object received and collected in a pocket construction 20, and a user's fragmentary finger 105 being directed into the pocket construction 20 for retrieving the small round object 26.

Figure 4:
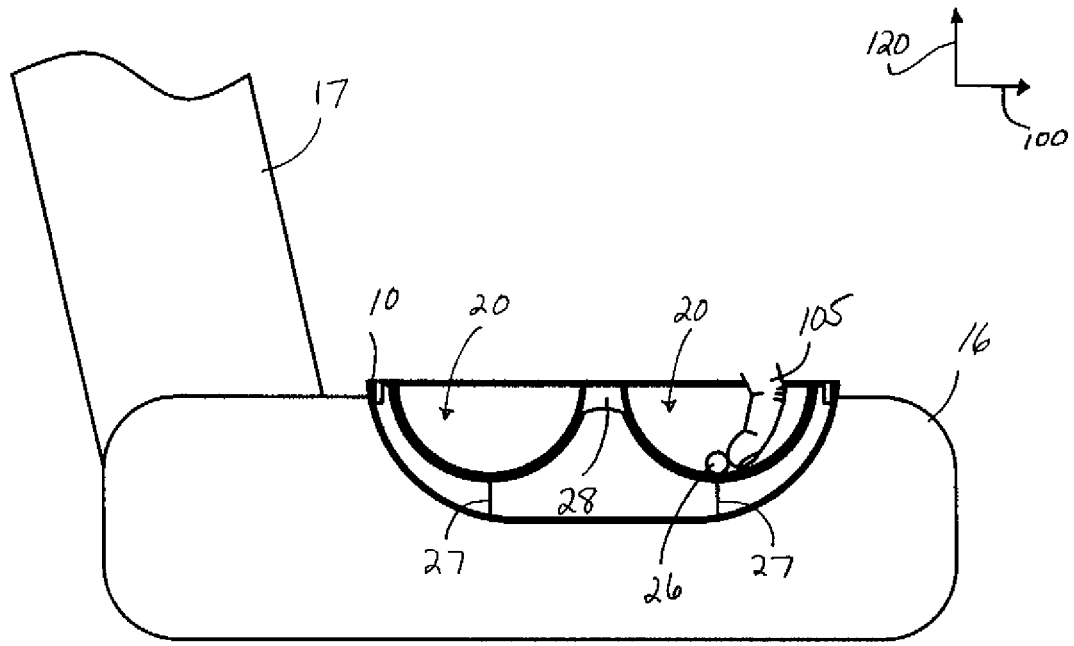
FIG. 4 is a third sequential longitudinal cross-sectional type depiction of the vehicular seat-to-hump gap-filling or gap filler device according to the present invention shown juxtaposed adjacent a vehicular seat with an object being directed through the pocket via a user's finger for subsequent manual collection.
Figure 5:
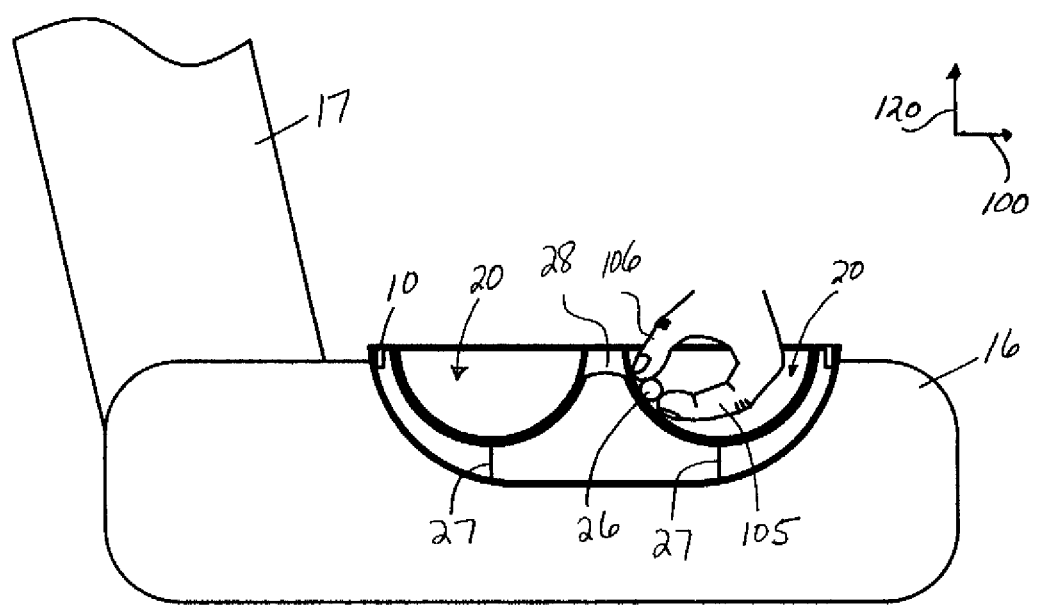
FIG. 5 is a fourth sequential longitudinal cross-sectional type depiction of the vehicular seat-to-hump gap-filling or gap filler device according to the present invention shown juxtaposed adjacent a vehicular seat with an object being manually collected.
Figure 6:
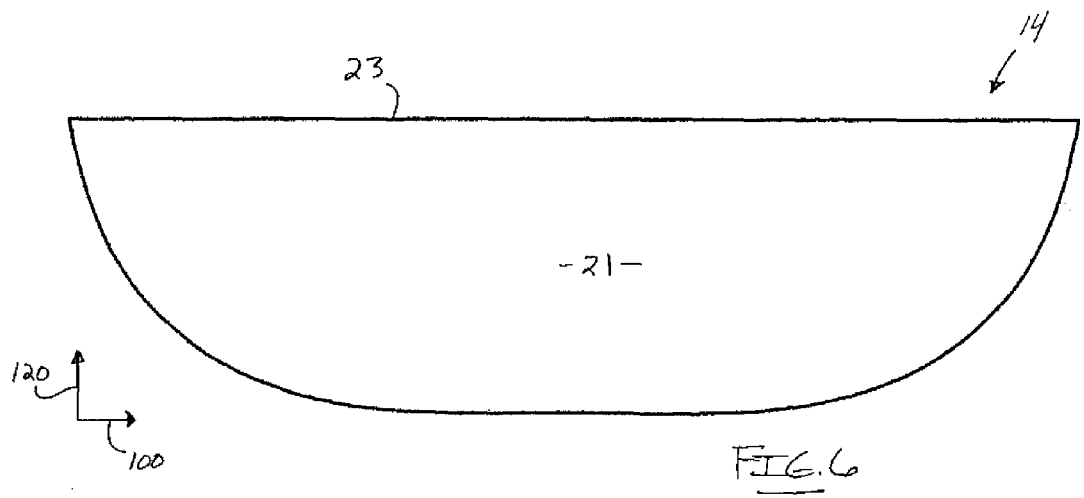
FIG. 6 is a lateral elevational view of a lower pocket construction of the vehicular seat-to-hump gap-filling or gap filler device according to the present invention.
Figure 7:
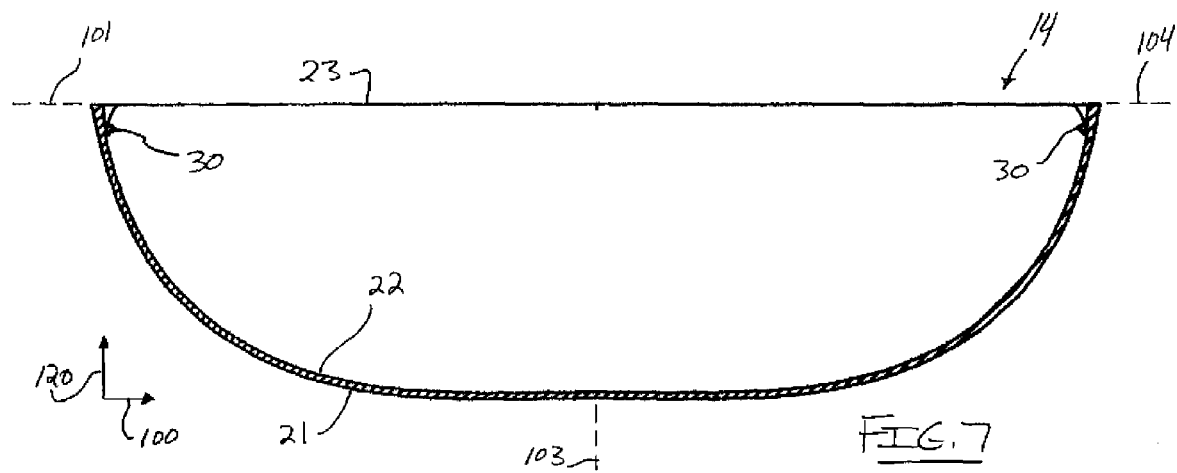
FIG. 7 is a longitudinal cross-sectional view of the lower pocket construction of the vehicular seat-to-hump gap-filling or gap filler device according to the present invention.
Figure 8:
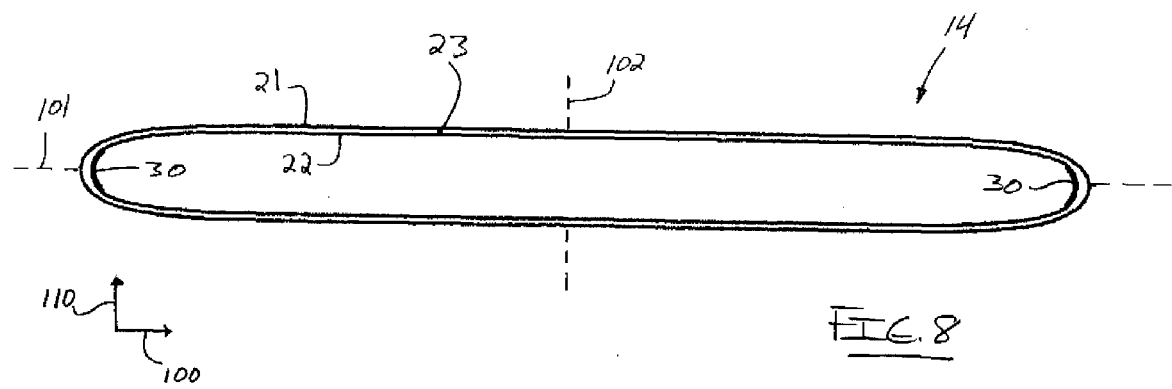
FIG. 8 is a top plan view of the lower pocket construction of the vehicular seat-to-hump gap-filling or gap filler device according to the present invention.
Figure 12:
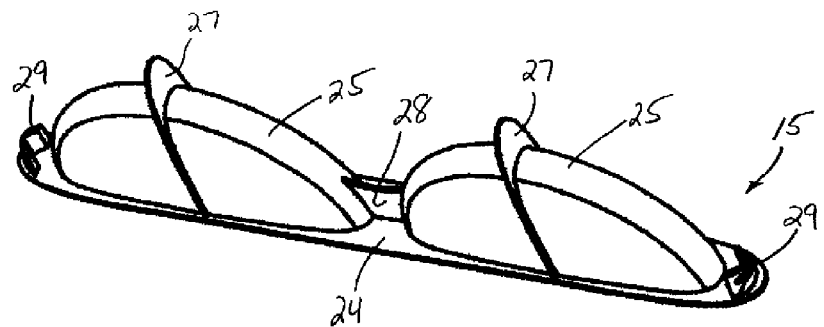
FIG. 12 is a bottom perspective view of the upper pocket construction of the vehicular seat-to-hump gap-filling or gap filler device according to the present invention.
Figure 13:
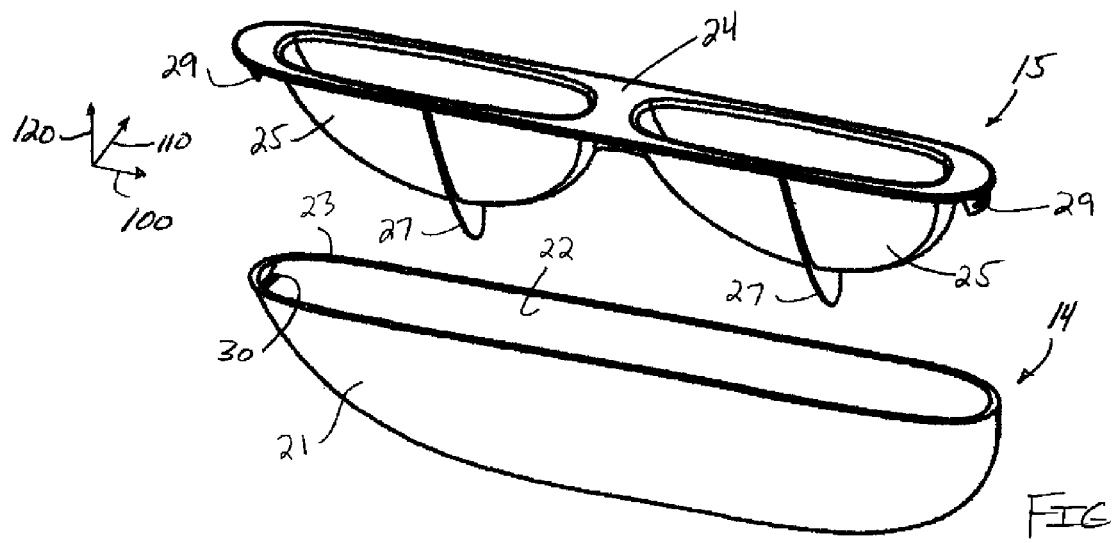
FIG. 13 is an exploded top perspective view of the upper and lower pocket construction of the vehicular seat-to-hump gap-filling or gap filler device according to the present invention.
Figure 14:
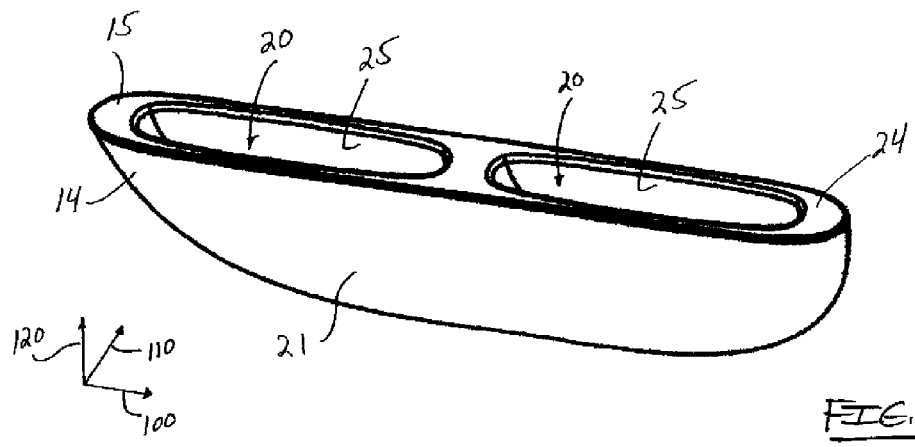
FIG. 14 is an assembled top perspective view of the upper and lower pocket construction of the vehicular seat-to-hump gap-filling or gap filler device according to the present invention.
Figure 15:
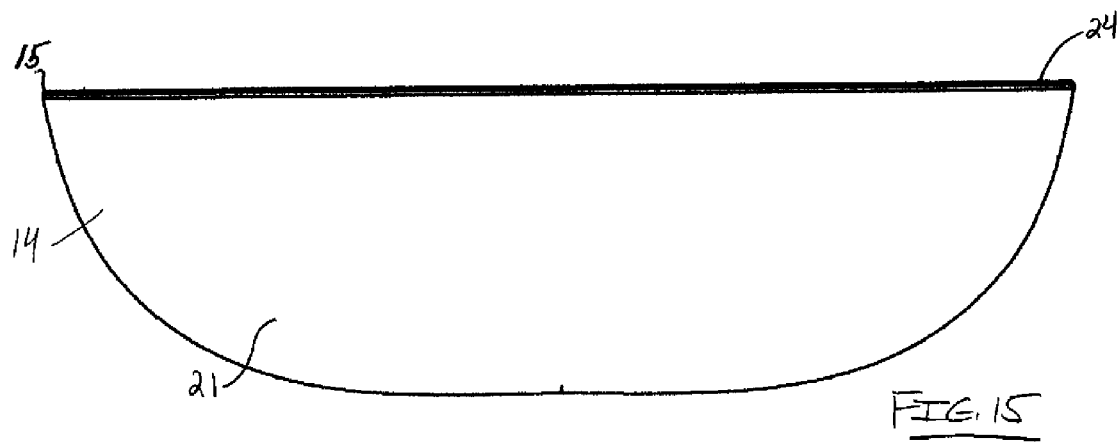
FIG. 15 is a lateral elevational view of the assembled vehicular seat-to-hump gap-filling or gap filler device according to the present invention.
Figure 16:
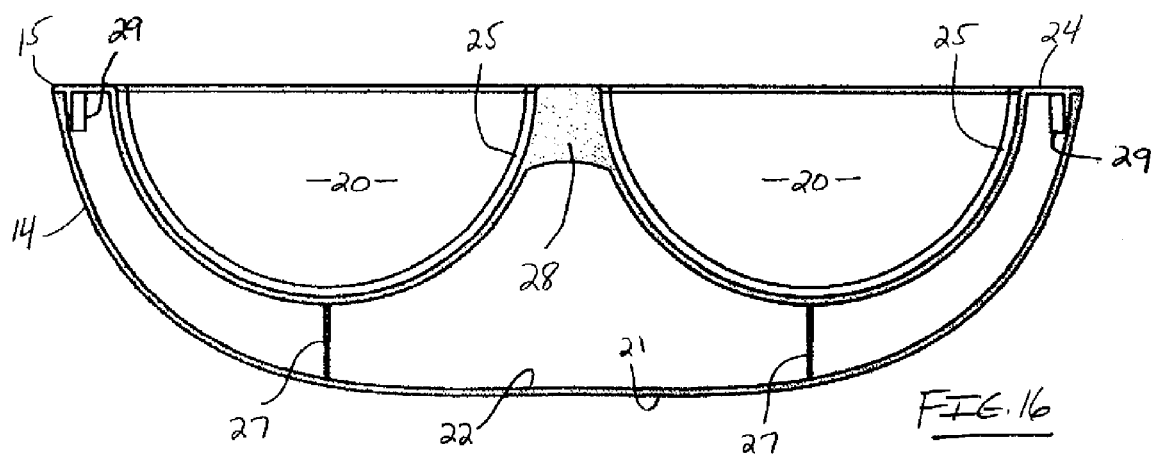
FIG. 16 is a longitudinal cross-sectional view of the assembled vehicular seat-to-hump gap-filling or gap filler device according to the present invention.
Figure 17:
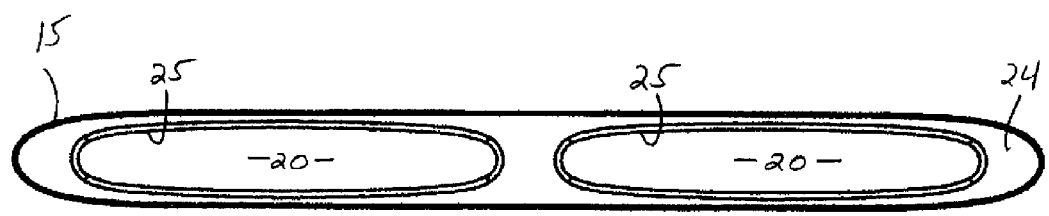
FIG. 17 is a top plan view of the assembled vehicular seat-to-hump gap-filling or gap filler device according to the present invention.

FIG. 4 depicts the user's fragmentary finger 105 engaging the small round object 26 for directing the small round object out of the pocket construction 20. The reader will please note that the depth of the pocket construction 20 is preferably on the same order of magnitude as the user's fragmentary finger length. This pocket construction depth enables the user to retrieve items via the user of a single finger, if necessary. Referencing FIG. 5, the reader will note that when an object such as object 26 is directed upwardly toward the mouth of the pocket construction 20, a user's fragmentary thumb 106 may help the user manually grab such an object.

While the above descriptions contain much specificity, this specificity should not be construed as limitations on the scope of the invention, but rather as an exemplification of the invention. For example, whenever possible, the same or similar reference numerals are used in the drawings and the specifications to refer to the same or like parts or steps. The drawings have been presented in simplified form and are not to precise scale.

The basic invention may be said to essentially teach or disclose a vehicular seat-to-hump gap filler device for insertion between a vehicular seat and a vehicular hump for closing the gap between said seat and hump. The vehicular seat-to-hump gap filler device according to the present invention may be said to essentially comprise a hemi-ellipsoidal lower pocket construction and at least one hemi-ellipsoidal upper pocket construction.

The hemi-ellipsoidal lower pocket construction is preferably sized and shaped for insertion between a vehicular seat and a vehicular hump, and each hemi-ellipsoidal upper pocket construction preferably comprises or defines a matter-receiving pocket. Each matter-receiving pocket basically functions to receive and collect matter directed theretowards or thereinto and enables a user to retrieve received matter as collected within each matter-receiving pocket. A pair of longitudinally aligned matter-receiving pockets is preferred, and each of the matter-receiving pockets is preferably interconnected via a rib element.

The vehicular seat-to-hump gap filler device according to the present invention may further preferably comprise certain spacer means for structurally spacing each matter-receiving pocket from the lower pocket construction as have been exemplified by the parabolic spacer elements 27. The vehicular seat-to-hump gap filler device according to the present invention further preferably comprises matter-receiving pocket(s) sized and shaped so as to enable a user's finger to extend into the pocket and touch a maximum extent thereof as at site 107 for enhancing the user's ability to manually (i.e. via one's finger(s) 105) retrieve matter collected within each matter-receiving pocket.

Stated another way, the vehicular seat-to-hump gap filler device according to the present invention may be said to essentially comprise a lower pocket construction as exemplified by the lower pocket construction 14 and at least one upper pocket construction as exemplified by the construction 25. The lower pocket construction is preferably sized and shaped for insertion between a vehicular seat and a vehicular hump, and each upper pocket construction defines a matter-receiving pocket. The matter-receiving pockets receive and collect matter directed theretowards or thereinto and enable a user to retrieve received matter as collected within each matter-receiving pocket.

Accordingly, although the invention has been described by reference to a number of embodiments, it is not intended that the novel device be limited thereby, but that modifications thereof are intended to be included as falling within the broad scope and spirit of the foregoing disclosure, the following claims, and the appended drawings.

I claim:

1. A vehicular gap filler pocket assembly for insertion between a vehicular seat and a vehicular transmission tunnel within a vehicular cabin for filling a gap between said seat and said transmission tunnel, the vehicular gap filler pocket assembly comprising:
a lower pocket construction, an upper pocket construction, and upper-to-lower construction locking means for selectively locking the upper pocket construction to the lower pocket construction, the lower pocket construction comprising a hemi-ellipsoidal outer surface, a hemi-ellipsoidal inner surface, and an upper rim, the hemi-ellipsoidal outer surface being sized and shaped for insertion between a vehicular seat and a vehicular transmission tunnel, the hemi-ellipsoidal inner surface for receiving a portion of the upper pocket construction, the upper pocket construction comprising an upper flange section and at least one semi-ellipsoidal cavity construction extending from the upper flange section, each semi-ellipsoidal cavity construction being receivable in adjacency to the hemi-ellipsoidal inner surface and comprising an upper matter-receiving pocket and a longitudinal cavity axis, the upper flange section being seatable upon the upper rim, each matter-receiving pocket for receiving and collecting matter and enabling a user to retrieve received matter as collected within each matter-receiving pocket.

2. The vehicular gap filler pocket assembly of claim 1 wherein a pair of semi-ellipsoidal cavity constructions extend from the upper flange section, the pair of semi-ellipsoidal cavity constructions being longitudinally aligned.

3. The vehicular gap filler pocket assembly of claim 1 wherein each semi-ellipsoidal cavity construction comprises a parabolic spacer element, each parabolic spacer element for structurally spacing each semi-ellipsoidal cavity construction from the inner surface of the lower pocket construction.

4. The vehicular gap filler pocket assembly of claim 3 wherein each parabolic spacer element extends orthogonally relative to each longitudinal cavity axis.

5. The vehicular gap filler pocket assembly of claim 1 wherein each semi-ellipsoidal cavity construction is structurally interconnected via a rib element for enhancing the strength and stability of the upper pocket construction.

6. The vehicular gap filler pocket assembly of claim 1 wherein each matter-receiving pocket is sized for enabling a user's finger to extend into each matter-receiving pocket and touch the maximum extent of each matter-receiving pocket for enhancing the user's ability to retrieve matter collected within each matter-receiving pocket.

7. A vehicular pocket assembly, the vehicular pocket assembly comprising:
a hemi-ellipsoidal lower pocket construction, at least one hemi-ellipsoidal upper pocket construction, and spacer means for structurally spacing each hemi-ellipsoidal upper pocket construction from the lower pocket construction, the hemi-ellipsoidal lower pocket construction being sized and shaped for (a) juxtaposition adjacent a vehicular seat and (b) receiving each hemi-ellipsoidal upper pocket construction, each hemi-ellipsoidal upper pocket construction comprising a matter-receiving pocket, each matter-receiving pocket for receiving and collecting matter and enabling a user to retrieve received matter as collected within each matter-receiving pocket.

8. The vehicular pocket assembly of claim 7 comprising a pair of longitudinally aligned matter-receiving pockets.

9. The vehicular pocket assembly of claim 7 wherein each matter-receiving pocket is interconnected via a rib element for enhancing the strength and stability of the upper pocket construction.

10. The vehicular pocket assembly of claim 7 wherein each matter-receiving pocket is size and shaped so as to enable a user's finger to extend into the pocket and touch a maximum extent thereof for enhancing the user's ability to retrieve matter collected within each matter-receiving pocket.

11. A gap filler pocket assembly, the gap filler pocket assembly comprising:
a lower pocket construction, an upper pocket construction, and spacer means for structurally spacing the upper pocket construction from the lower pocket construction, the lower pocket construction being sized and shaped primarily for insertion in a vehicular gap, the upper pocket construction defining at least one matter-receiving pocket, each matter-receiving pocket for receiving and collecting matter and enabling a user to retrieve received matter as collected within each matter-receiving pocket.

12. The gap filler pocket assembly of claim 11 comprising a pair of longitudinally aligned matter-receiving pockets.

13. The gap filler pocket assembly of claim 11 wherein each matter-receiving pocket is interconnected via a rib element for enhancing the strength and stability of the upper pocket construction.

14. The gap filler pocket assembly of claim 11 wherein each matter-receiving pocket is sized and shaped so as to enable a user's finger to extend into the pocket and touch a maximum extent thereof for enhancing the user's ability to retrieve matter collected within each matter-receiving pocket.

15. A gap filler pocket assembly primarily for use within a vehicular cabin to fill gaps within the vehicular cabin, the gap filler pocket construction comprising:
a two-piece pocket assembly, the two-piece pocket assembly comprising a first, lower pocket construction and a second, upper pocket construction attachable to the first, lower pocket construction, the second, upper pocket construction defining at least one matter-receiving pocket, each matter-receiving pocket for receiving and collecting matter in upper adjacency to the first, lower pocket construction.

16. The gap filler pocket assembly of claim 15 comprising spacer means for structurally spacing each matter-receiving pocket in upper adjacency relative to the first, lower pocket construction.

17. The gap filler pocket assembly of claim 16 wherein the spacer means are defined by at least one spacer element, each spacer element extending orthogonally relative to a longitudinal axis of the first, lower pocket construction.

18. The gap filler assembly of claim 15 wherein the second, upper pocket construction comprises a pair of cavity constructions, the pair of cavity constructions being longitudinally aligned.

19. The gap filler pocket assembly of claim 18 wherein each cavity construction is structurally interconnected via a rib element for enhancing the strength and stability of the second, upper pocket construction.

20. The gap filler pocket assembly of claim 15 comprising upper-to-lower construction locking means for selectively locking the second, upper pocket construction to the first, lower pocket construction.

\* \* \* \* \*